(12) United States Patent
Read

(10) Patent No.: US 10,583,536 B2
(45) Date of Patent: Mar. 10, 2020

(54) METHOD FOR FABRICATING VACUUM FIXTURING USING GRANULAR MEDIA

(71) Applicant: Technical Tooling L.L.C., Tacoma, WA (US)

(72) Inventor: Robert W. Read, Lakewood, WA (US)

(73) Assignee: Technical Tooling L.L.C., Tacoma, WA (US)

( * ) Notice: Subject to any disclaimer, the term of this patent is extended or adjusted under 35 U.S.C. 154(b) by 0 days.

(21) Appl. No.: 15/913,616

(22) Filed: Mar. 6, 2018

(65) Prior Publication Data

US 2018/0193968 A1    Jul. 12, 2018

Related U.S. Application Data

(63) Continuation of application No. 14/881,925, filed on Oct. 13, 2015, now Pat. No. 10,300,569.

(60) Provisional application No. 62/063,816, filed on Oct. 14, 2014.

(51) Int. Cl.
| | |
|---|---|
| *B23Q 3/06* | (2006.01) |
| *B23Q 3/08* | (2006.01) |
| *B29C 70/44* | (2006.01) |
| *B29K 63/00* | (2006.01) |
| *B29K 263/00* | (2006.01) |

(52) U.S. Cl.
CPC ............. *B23Q 3/088* (2013.01); *B23Q 3/065* (2013.01); *B29C 70/44* (2013.01); *B29K 2063/00* (2013.01); *B29K 2263/00* (2013.01)

(58) Field of Classification Search
CPC ..... B29C 51/10; B29C 51/14; B29C 33/0011; B29C 33/38; B29C 33/3842; B29C 33/3857; B23Q 3/088; B23Q 3/08
See application file for complete search history.

(56) References Cited

U.S. PATENT DOCUMENTS

| | | |
|---|---|---|
| 2,617,719 A | 11/1952 | Stewart |
| 2,625,886 A | 1/1953 | Browne |
| 3,146,148 A | 8/1964 | Mitchella et al. |
| 3,187,444 A | 6/1965 | Russell |
| 3,689,025 A | 9/1972 | Kiser |
| 3,834,687 A | 9/1974 | Martin |
| 3,953,013 A | 4/1976 | Griffith |
| 3,968,885 A | 7/1976 | Hassan et al. |
| 4,029,517 A | 6/1977 | Rand |
| 4,063,705 A | 12/1977 | Vodra |
| 4,091,643 A | 5/1978 | Zucchini |

(Continued)

OTHER PUBLICATIONS

Handymath.com. Percentage by Weight to Percentage by Volume Conversion Calculator. https://www.handymath.com/cgi-bin/dnstywtvol.cgi?submit=Entry (Year: 2019).*

*Primary Examiner* — Tyrone V Hall, Jr.
(74) *Attorney, Agent, or Firm* — Knobbe Martens Olson & Bear LLP

(57) ABSTRACT

A method for fabricating vacuum tooling is disclosed using porous granular media. A sheet of steel webbing is affixed to a frame. A plurality of layers of fiberglass is affixed to the webbing. A vacuum port is installed through the webbing and plurality of layers of fiberglass. A granular media is mixed with epoxy to form a granular mixture. The granular mixture is layered over the plurality of layers of fiberglass to form a flat surface and machined for uniformity before sealing.

19 Claims, 12 Drawing Sheets

(56) References Cited

U.S. PATENT DOCUMENTS

| | | | |
|---|---|---|---|
| 4,355,937 A | 10/1982 | Mack et al. | |
| 4,367,140 A | 1/1983 | Wilson | |
| 4,406,596 A | 9/1983 | Budde | |
| 4,474,199 A | 10/1984 | Blaudszun | |
| 4,521,995 A | 6/1985 | Sekiya | |
| 4,541,717 A | 9/1985 | Itamoto | |
| 4,549,467 A | 10/1985 | Wilden et al. | |
| 4,597,228 A * | 7/1986 | Koyama | B24B 7/228 451/289 |
| 5,576,030 A | 11/1996 | Hooper | |
| 5,645,474 A * | 7/1997 | Kubo | B24B 37/32 451/287 |
| 5,730,764 A * | 3/1998 | Williamson | B24D 3/28 430/913 |
| 6,012,883 A | 1/2000 | Engwall et al. | |
| 6,032,997 A | 3/2000 | Elliott | |
| 6,309,587 B1 | 10/2001 | Gniatvzyk et al. | |
| 6,679,758 B2 * | 1/2004 | Bright | B24B 5/363 451/28 |
| 7,021,635 B2 | 4/2006 | Sheydayi | |
| 7,434,590 B2 | 10/2008 | Sheydayi | |
| 7,446,020 B2 | 11/2008 | Nakamura | |
| 7,654,887 B2 * | 2/2010 | Ishikawa | B24B 37/30 451/388 |
| 7,938,466 B2 | 5/2011 | Joguet | |
| 8,298,473 B2 | 10/2012 | Dull et al. | |
| 8,403,188 B2 | 3/2013 | Platsch | |
| 2003/0194947 A1 * | 10/2003 | Bright | B24B 5/363 451/28 |
| 2005/0161861 A1 | 7/2005 | Lammers et al. | |
| 2006/0073677 A1 | 4/2006 | Nakamura | |
| 2006/0130875 A1 | 6/2006 | Sheydayi | |
| 2007/0063453 A1 * | 3/2007 | Ishikawa | B24B 37/30 279/3 |
| 2009/0008825 A1 | 1/2009 | Eberth | |
| 2016/0184943 A1 | 6/2016 | Read et al. | |
| 2018/0243870 A1 | 8/2018 | Read | |

* cited by examiner

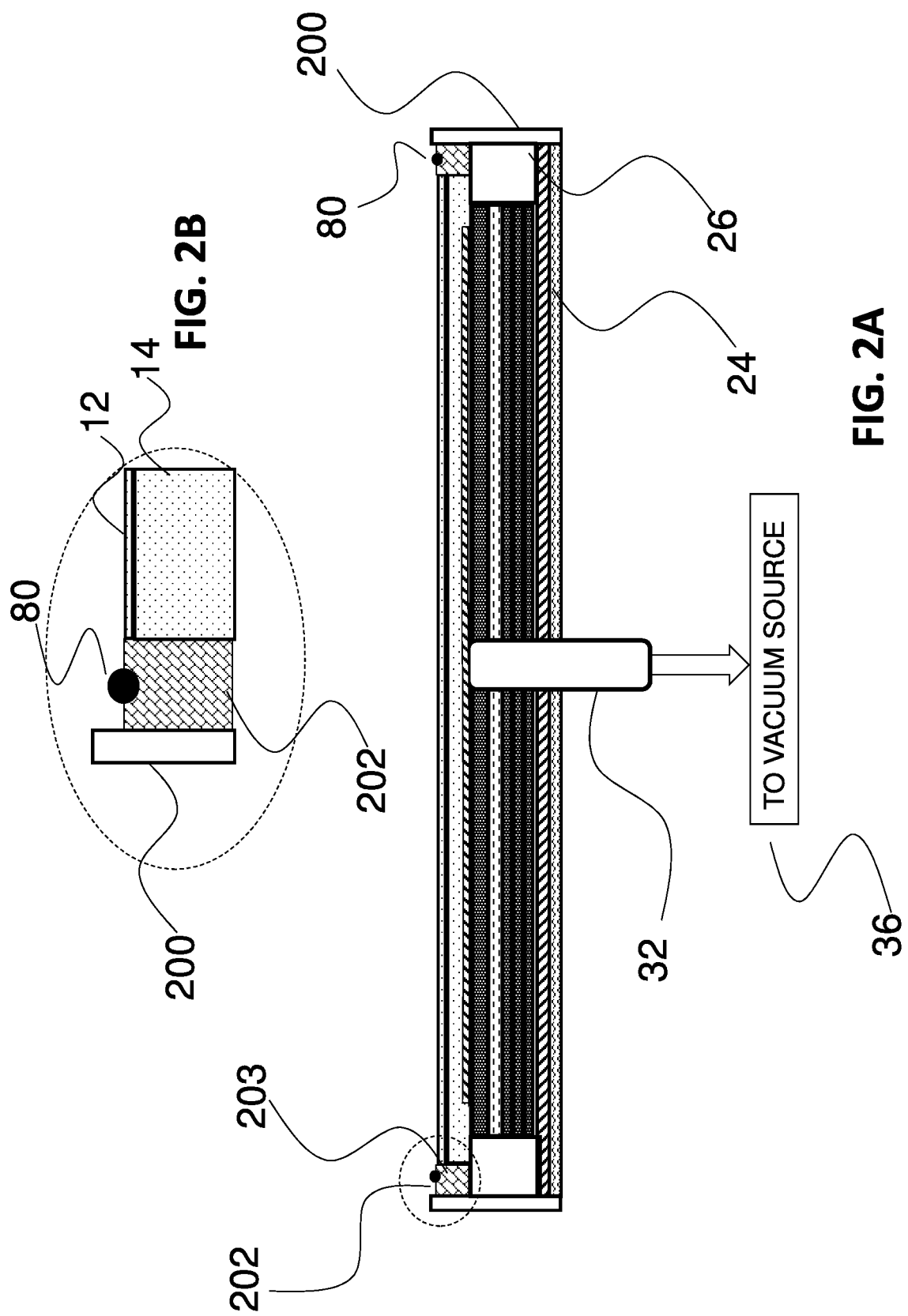

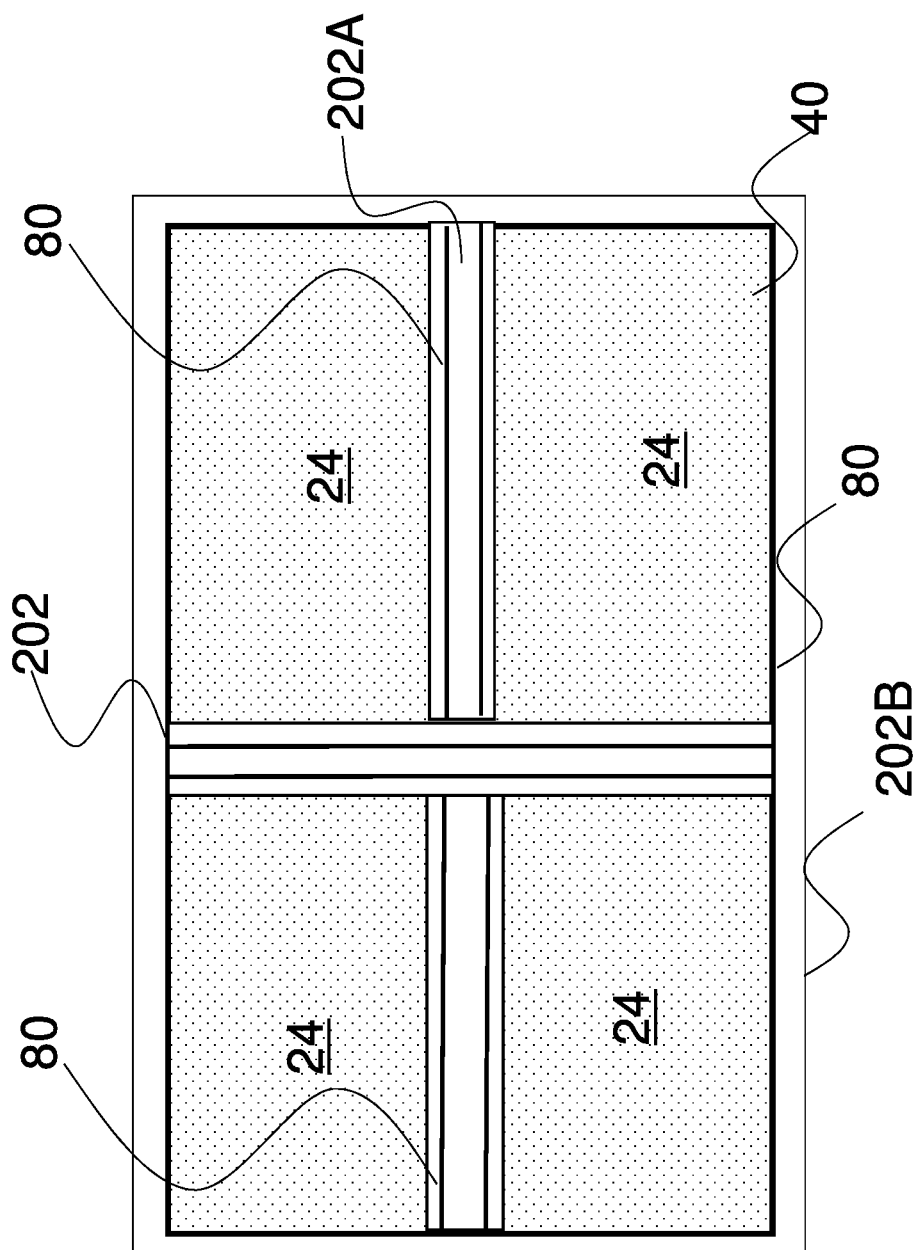

METHOD FOR FABRICATING VACUUM FIXTURING USING GRANULAR MEDIA

CROSS-REFERENCE TO RELATED APPLICATIONS

This application is a continuation of U.S. application Ser. No. 14/881,925, entitled "METHOD FOR FABRICATING VACUUM FIXTURING USING GRANULAR MEDIA" and filed on Oct. 13, 2015, which in turn claims the benefit of U.S. Provisional Application No. 62/063,816, entitled "METHOD FOR FABRICATING VACUUM FIXTURING USING SINTERED MEDIA" and filed Oct. 14, 2014, the disclosures of which are incorporated herein by reference.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention relates to methods for holding thin metal and/or composite surfaces for machining, and, more particularly, to a method for making a vacuum tooling fixture from a porous granular material.

Current manufacturing demands faced by the aerospace industry require thinner, stronger parts in order to meet constantly more demanding standards for lowering costs, improving safety and increasing fuel mileage. As a result, manufacturers are faced with machining thin walled parts using high speed processes. Machining complex shapes with walls having thickness in the range of, for example, 0.010" to 0.060" (0.025 to 0.15 cm). Such parts are prone to wander on a machining fixture when being drilled or milled, for example.

Some have unsuccessfully tried to address this problem using vacuum methods including the use of materials like micro-balloons. Unfortunately, these materials are relatively costly and hard to shape into intricate parts. Because epoxy resin is typically used to bind round micro-balloons comprising such older materials it cannot easily be shaped or repaired if damaged. A significant drawback is that, since such materials have inherently smooth surfaces, they do not prevent slippage of many thin-walled parts while the parts are undergoing machining.

The present invention provides a method for making vacuum tooling fixtures that solve the aforesaid problems. For the first time, tile inventors herein have discovered and developed a new and useful gritty and/or abrasive vacuum media that secures thin-walled parts in place for machining, that is easily repairable when damaged, and is low cost compared to prior methods and materials.

For example, in an advantage over previously available systems the vacuum media of the present invention is made of epoxy and gritty and/or abrasive granular material which may easily be formed and patched as desired. Thus cuts or holes drilled into the granular media may be repaired as necessary for continued use.

BRIEF SUMMARY OF THE DISCLOSURE

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment a method for fabricating a vacuum table is disclosed using porous granular media. A sheet of steel webbing is affixed to a frame. A plurality of layers of fiberglass is affixed to the webbing. A vacuum port is installed through the webbing and plurality of layers of fiberglass. A granular media is mixed with epoxy to form a granular mixture. The granular mixture is layered over the plurality of layers of fiberglass to form a flat surface and machined for uniformity before sealing.

In one aspect the granular media consists essentially of sintered iron grit or epoxy resin.

In another aspect a course of spiral wrap tubing is encompassed by the granular mixture.

In another aspect the course of spiral wrap tubing is configured in a serpentine pattern, a circular pattern, a branching pattern and/or an oval pattern.

In another aspect an additional stiffener is added between the granular mixture layer and the plurality of layers of fiberglass.

In another aspect the additional stiffener comprises a layer of balsa wood and another layer of fiberglass.

In another aspect a tooling fixture with vacuum granular media is disclosed including a pedestal and a part holding section attached atop the pedestal. A vacuum port is coupled to the part holding section and a fiberglass lining is applied to the inside of the part holding section. A porous granular media and epoxy mixture are positioned in communication with the vacuum port. A urethane barrier seals the porous granular media, and an O-ring groove is cut in the urethane barrier.

In yet another aspect of the invention, a method for vacuum forming of thermally pliable parts using porous granular media is disclosed. The method includes:
  providing a tooling fixture with porous granular media comprising:
    a pedestal,
    a part holding section attached atop the pedestal,
    a vacuum port coupled to the part holding section,
    a fiberglass lining applied to the inside of the part holding section,
    a porous granular media and epoxy mixture in communication with the vacuum port,
    a urethane barrier sealing the porous granular media, and
    an O-ring groove in the urethane barrier;
  thermally activating a part using a heating source;
  removing the part from the heating source;
  placing the part into the tooling fixture; and
  conforming the part to the tooling fixture by applying vacuum pressure.

BRIEF DESCRIPTION OF THE DRAWINGS

FIG. 2A schematically illustrates a cut-away side view of an example of an assembled vacuum table with a vacuum tube attached.

FIG. 2B schematically illustrates a detail of a partial cut-away side view of an example of the assembled vacuum table of FIG. 2A.

FIG. 3 schematically shows a top view of an example of an assembled vacuum table.

DETAILED DESCRIPTION OF THE PREFERRED EMBODIMENT

The examples presented herein are for the purpose of furthering an understanding of the invention. The examples are illustrative and the invention is not limited to the example embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Definitions

Generally, as used herein, the following terms have the following meanings unless the context suggests otherwise:

"Vacuum granular media" or "porous granular media" means any of gritty non-silica granular media including sintered iron, epoxy resin granules and/or other irregularly-shaped, gritty and/or abrasive granular material capable of transmitting a distributed vacuum force through a layer of the media having a thickness, for example, in the range of about 0.5 to about 2.0 inches. "Vacuum source" means a source for providing a vacuum pressure of, for example, at least about 14.7 psi.

"Fluid communication" means connected to as to allow for pressure flow or air flow.

Vacuum Table with Granular Media

Figure 1:
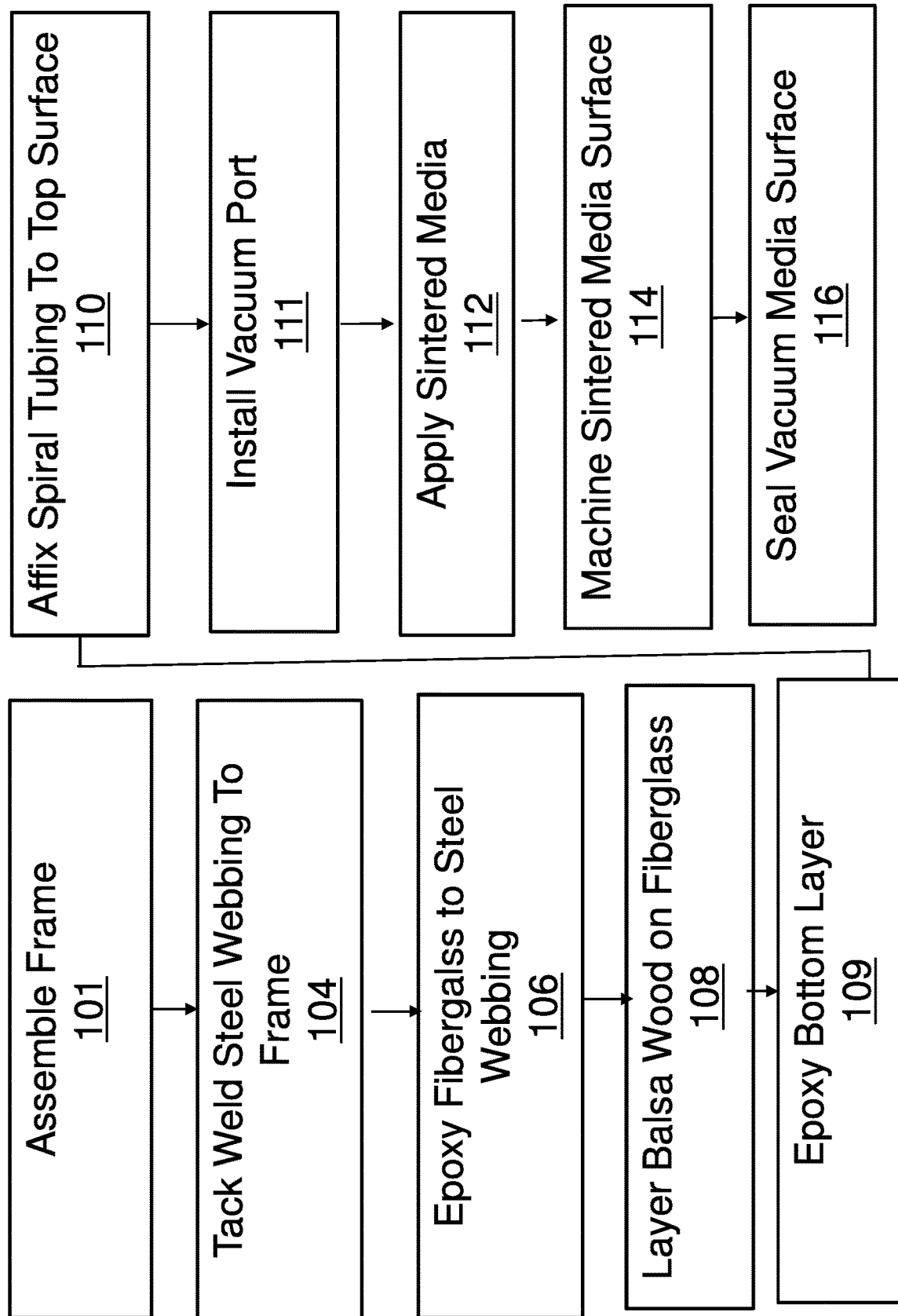
FIG. 1 schematically shows a block diagram of a process for fabricating a vacuum table using porous granular media.

Referring now to FIG. 1, a block diagram of a process for fabricating a vacuum table using porous granular media in accordance with the principles disclosed herein is schematically shown. A granular media vacuum table has been made by the inventors according to the following steps:

At step 101 a frame is made from a framing material such as, for example, steel in the shape of the table as desired. Usually the table is a rectangular table wherein a plurality of sections of vacuum surfaces may be installed. Hollow steel tubing may be advantageously employed and cut to the lengths desired depending on the application. The tubing is welded together or otherwise attached to form the frame.

At step 104 a sheet of, for example, expanded steel webbing is tack welded to the frame. Then, at step 106, a plurality of layers of fiberglass are affixed epoxy to the steel webbing. For added strength, at step 108 an additional stiffener, such as, for example, a layer of balsa wood may be affixed to the top of the fiberglass and itself covered with another layer of fiberglass. A layer of epoxy may be affixed to the bottom of the webbing at step 109 for added rigidity and stability.

At step 110 a course of spiral wrap tubing may optionally be affixed to the top surface of the top fiberglass layer as, for example, by using hot melt glue or an equivalent method. The course of spiral tubing is selected to disperse the vacuum according to the vacuum media surface area. For surface areas less than six inches square, spiral tubing may not be needed. For larger areas the tubing may be advantageously laid out to form a serpentine pattern, a circular pattern, branching pattern, an oval or the like so as to distribute the vacuum force uniformly and form vacuum sections of about six square inches or less as a general rule. When needed depending on the application, sections of commercially available spiral tubing of about ⅜ inch can be connected using T connectors or straight connectors. At step 111, or before the spiral tubing is applied, as is most convenient, a vacuum port is installed by cutting a suitable aperture through the laminated materials and adding a flange, pipe or other vacuum attachment mechanism to the bottom of the table as shown herein below. The spiral tubing should be in fluid communication with the vacuum introduced through the vacuum tube that is the vacuum is allowed to flow through the course of spiral tubing.

Then, at step 112, a mixed formulation of vacuum granular media is applied over the spiral tubing to form the top surface of the vacuum table. The layer of granular vacuum media is then applied over and covers the spiral wrap tubing and the laminated surface. At step 114 the vacuum media surface is machined to a smooth, flat finish. At step 116 the granular vacuum media is spray-painted to seal the surface and encapsulate small loose particulates.

Figure 2:
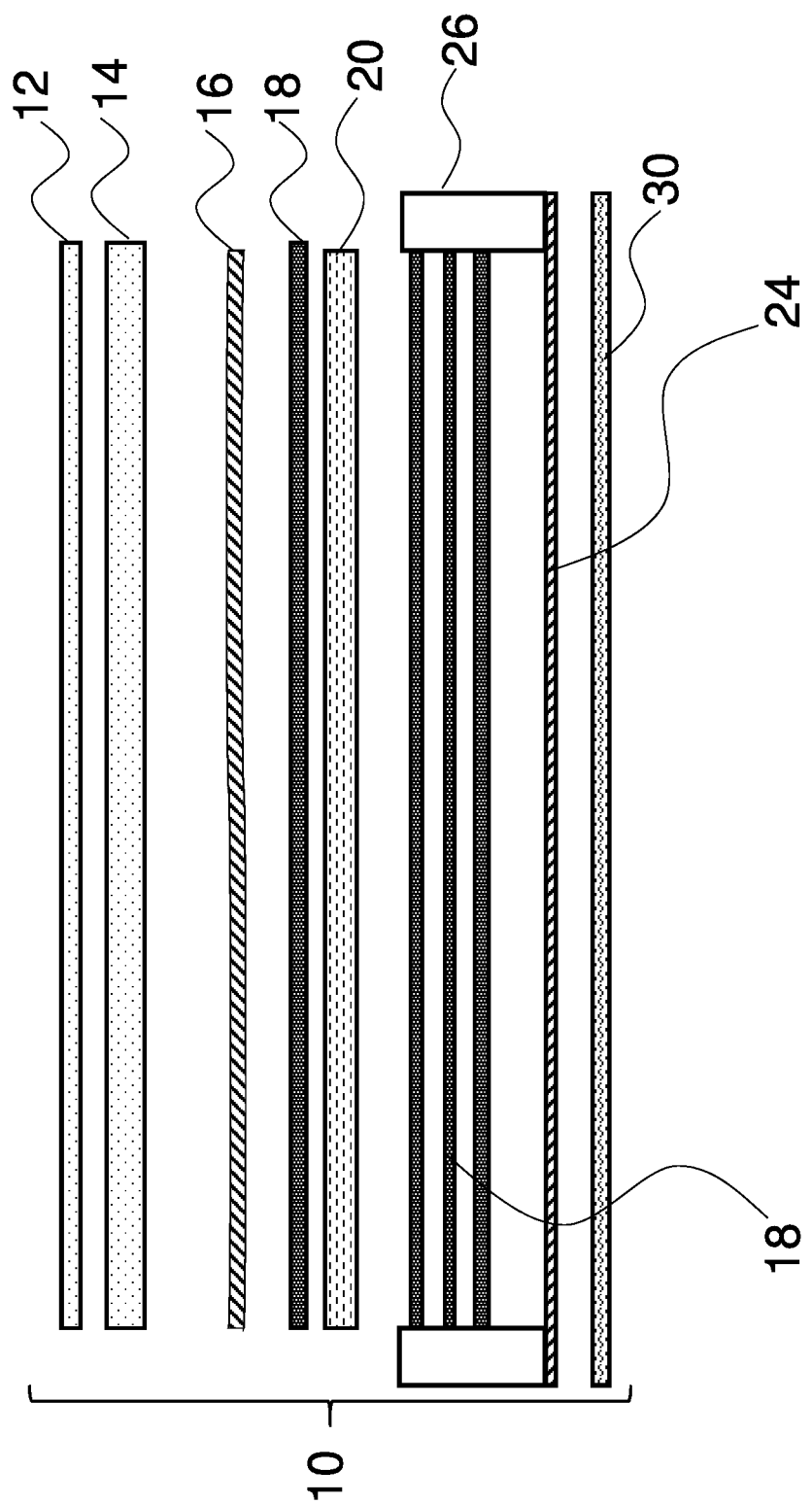
FIG. 2 schematically shows an exploded cut-away side view of an example of a vacuum table made in accordance with the principles disclosed herein.

Referring now to FIG. 2, an exploded cut-away side view of an example of a vacuum table made in accordance with the principles disclosed herein is schematically shown. A vacuum table 10 includes a top film 12, a layer of porous granular material 14, optional spiral tubing 16, an optional layer of coated fiberglass 18, an optional layer of stiffener 20, a plurality of layers of coated fiberglass 18, a tack-welded sheet of expanded steel webbing 24, a frame 26 and a bottom layer of epoxy resin 30 with filler for added stability.

Although the porous granular material may comprise various types of materials, in one useful embodiment, the granular material comprises a non-silica abrasive in the form of a non-silica, fine abrasive black sand available from Kleen Blast company located in Danville Calif. In one example a fine abrasive is rated at about 35 grit size. Such abrasives are commonly used for sand blasting and may comprise sintered iron. Another useful type of abrasive is finally crushed walnut shell however, this has the drawback of absorbing moisture and is also heat sensitive. The granular vacuum media may advantageously be composed of general-purpose epoxy and abrasive. The ratio of epoxy to sand in one example is about 8% epoxy to about 92% abrasive. One useful type of epoxy is made by Dura technologies. 80 LS-25AT, thixed. In one useful embodiment, the fiberglass used to laminate the table comprises 20 ounce woven fiber glass cloth which is commercially available. The top film 12 may comprise any useful sealer such as spray paint, 30 epoxy and the like. To ensure penetration into the media the sealer may be applied under vacuum conditions.

In another useful example, the granular material may advantageously comprise an epoxy resin formed into granular particles. One example of a method for making granulated particles from epoxy resin follows the steps below:
1. Epoxy resin in liquid form is poured into a container to form ¼" sheets;
2. The sheets are allowed to harden;
3. The hardened sheets are broken into small pieces using a hammer mill such as is used in commercial mining;
4. The pieces are milled down to about 0.060 to 0.100 thousandths of an inch or to about a 36 grit; and
5. The grit is mixed with liquid epoxy as described herein and cast into a rough shape and then machined as desired.

One advantage of using the aforedescribed granular materials like sintered media and epoxy resin is that they do not absorb moisture and will not swell when exposed to humid or damp environments.

Referring now to FIG. 2A, a cut-away side view of an example of an assembled vacuum table with a vacuum tube attached is schematically illustrated. During assembly, a vacuum hose or pipe 32 is inserted up through a hole 33 cut through the lamented surface. The hose 32 is coupled to a vacuum source 36 as indicated by direction arrow 34 to allow the vacuum to suction air through the granular media 14. Any part resting on the surface of the granular media will be held in place by the suction and the gritty surface of the granular media.

Referring now to FIG. 2B, a detail of a partial cut-away side view of an example of the assembled vacuum table of FIG. 2A is schematically illustrated. Aluminum or steel plates 200 may be used to brace the vacuum table components during final assembly. The edges of the top layers of paint 12 and granular media 14 may be machined away to provide a channel 203 around 30 the vacuum table. A layer of urethane 202 is poured into the channel 203 to form a buffer around the perimeter of the vacuum table or a vacuum table section as the case may be. An O-ring groove is cut, molded or milled into the urethane layer and an O-ring 80 is affixed inside the O-ring groove to provide a vacuum seal with any flat surface placed on the vacuum table when activated by powering on a coupled vacuum source 36. The urethane layer may itself include an edge that advantageously protrudes above the surface of the coated granular media to provide a buffer or edge for tooling plates or the like when being located on the table for machining.

Referring now to FIG. 3, a top view of an example of an assembled vacuum table is schematically shown. This example includes a plurality of vacuum sections 40 separated by a barrier, such as a layer of urethane 202. Each of the vacuum surfaces are milled to a flatness in the same horizontal plane as the others and coated as described above. Each of the vacuum surfaces will also be separately and directly coupled to one or more vacuum sources (as shown above). Each vacuum section 40 may be surrounded by 15 interior 202A and exterior urethane barriers 202B. The exterior urethane barrier 202B may uniformly protrude above each vacuum surface 40 to allow tooling plates to be positioned onto the surface using it as a mechanical guide or block. A plurality of O-rings 80 are installed in the urethane barriers to seal the perimeter of each vacuum surface 40. While four vacuum surfaces are shown, those skilled in the art having the benefit of this disclosure will recognize that the number of surfaces incorporated into a vacuum table can vary as is desired.

In a useful embodiment the vacuum sections 40 together with the exterior and interior urethane barriers may be constructed to have a standardized surface area to match the size of standard tooling plates. For example, the vacuum sections may be sized to accommodate 12×12 inch, 12×24 inch or 24×24 inch plates and so on as desired.

Figure 4:
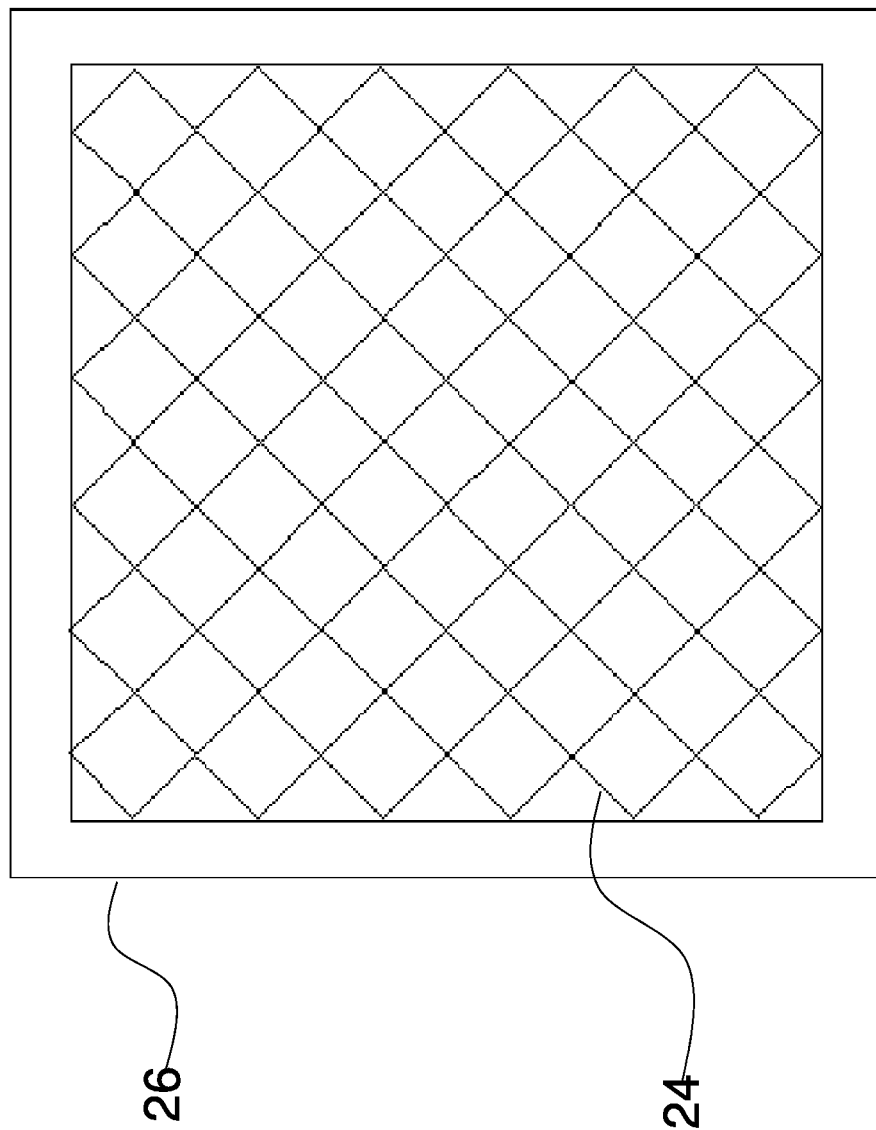
FIG. 4 schematically shows a top view of an example of expanded steel mesh material used in the assembly of a vacuum table.

Referring now to FIG. 4, a top view of an example of expanded steel mesh material used in the assembly of a vacuum table is schematically shown. The expanded steel sheet 24 is formed of webbing 25 and is commercially available in various thicknesses. Also shown is the frame 26 constructed of, for example, hollow steel tubes. In some embodiments other materials may be substituted for the expanded steel webbing. These may include webbing or mesh made from steel, plastic, nylon, polyethylene, aluminum, composites, metal and combinations thereof.

Tooling Fixture with Granular Media

Figure 5:
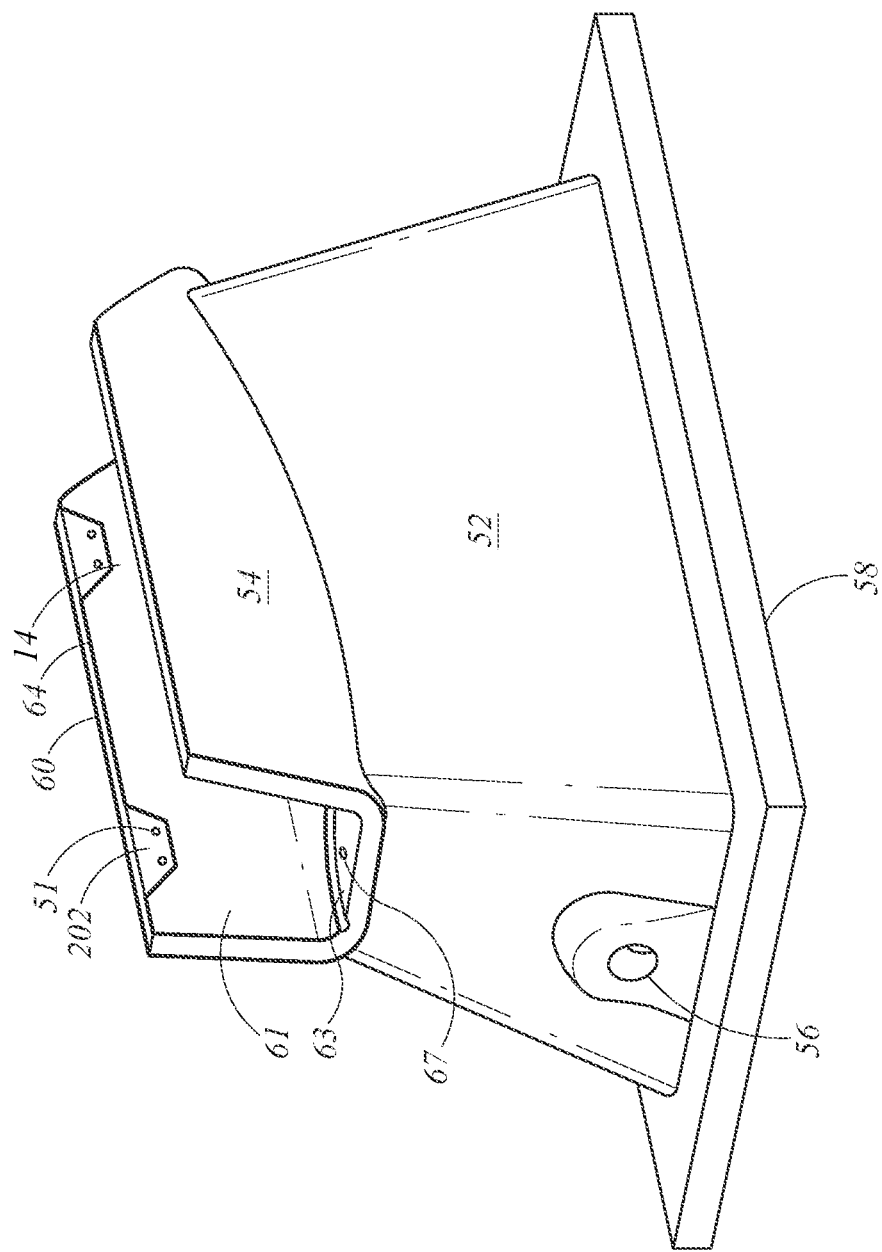
FIG. 5 schematically shows an example of a tooling fixture made for use with the vacuum granular media as disclosed herein.

Referring now to FIG. 5, an example of a tooling fixture made for use with the vacuum granular media as disclosed herein is schematically shown. A tooling fixture 50 includes a pedestal 52, a part holder 54, a vacuum port 56 and a base 58. The pedestal 52 and part holding section 54 are machined from a commercially available block closed-cell polystyrene foam such as the trademarked brand Styrofoam®. In one embodiment foam rated at 3.5 lb. per ft$^3$ density was employed. In fabricating the tooling fixture the foam block is cut generally in the shape of the part to be held for machining with extra room for the vacuum media to be applied. After cutting the block into shape, a fiberglass lining 60 is applied to the inside of the part holding section 54. The interior 61 comprises a machined section of granular media and epoxy mixture 14 located 20 below an O-ring groove 64 above which is cut into a layer of urethane 202. A machining slot 63 is cut into the part holder 54 to accommodate cutting tool operations. This is described in more detail below. Depending on the application other machining holes 51 may be included in the tooling fixture. In some examples a spring loaded locating pin 67 may be affixed to the tooling fixture.

In one useful embodiment the base 58 may be made from a three-quarter inch IC six aluminum tooling plate. Other materials may also be used such as fiberglass, laminates and the like. The top of the plate is ground smooth and flat and an elongated bonding epoxy is applied for bonding the pedestal to the plate. The pedestal may advantageously be made oversized for stability. It is put on the base and positioned on a vacuum table. Once the tooling fixture 50 is in place on the table, the vacuum is activated thereby holding the fixture and (not shown) part in place.

Figure 6:
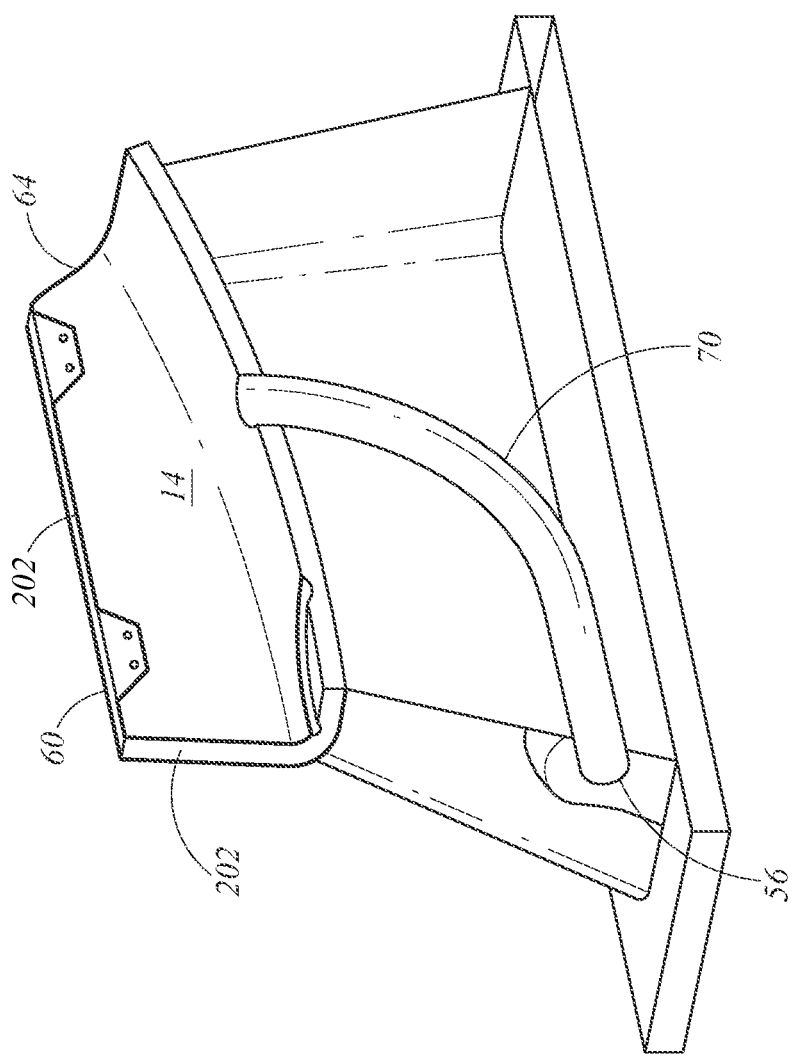
FIG. 6 schematically illustrates a cut-away side view of an example of a tooling fixture made for use with the vacuum granular media as disclosed herein.

Referring now to FIG. 6, a cut-away side view of an example of a tooling fixture made with the vacuum granular media as disclosed herein is schematically illustrated. After cutting a slot through the middle of the tooling fixture, a vacuum tube 70, such as a ¾ inch flexible vacuum tube is inserted into the pedestal up to an outlet port 56 cut through the foam block and the fiberglass liner 60. A small groove sized for inserting a sealing ring (commonly called an O-ring) 64 is cut into the urethane layer 202 for tightly sealing the part holding section 54 when a vacuum is applied. The O-ring groove 64 will be cut into the shape of the perimeter of the (not shown) part to be machined. After the vacuum tube is installed the slot may be refilled with or packed with foam block material.

Figure 7:
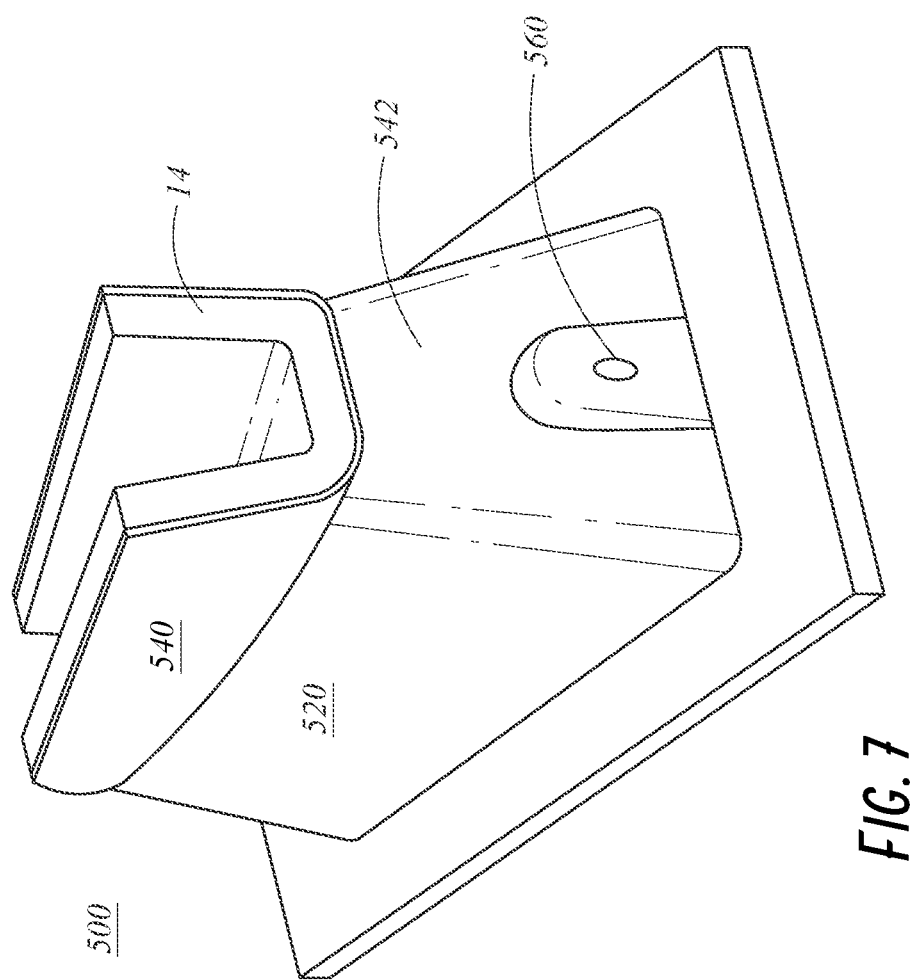
FIG. 7 shows an example of a tooling fixture made with the vacuum granular media as disclosed herein prior to machining the granular material for the addition of the urethane layer.

Referring now to FIG. 7, an example of a tooling fixture made with the vacuum granular media as disclosed herein prior to machining the granular material. This tooling fixture is shown at the stage after installing the fiberglass liner and packing in the granular material, but prior to adding the urethane layer. Note that the granular material 14 is packed with extra thickness so that it can set and be machined down to form channels for the urethane layer to be added later. The tooling fixture 500 includes a pedestal 520, a part holding section 540, and a vacuum port 560. For illustrative purposes slots 542 have been left uncovered to show where the foam block was cut for the purposes of installing the vacuum tube as shown in FIG. 6, for example.

Figure 8:
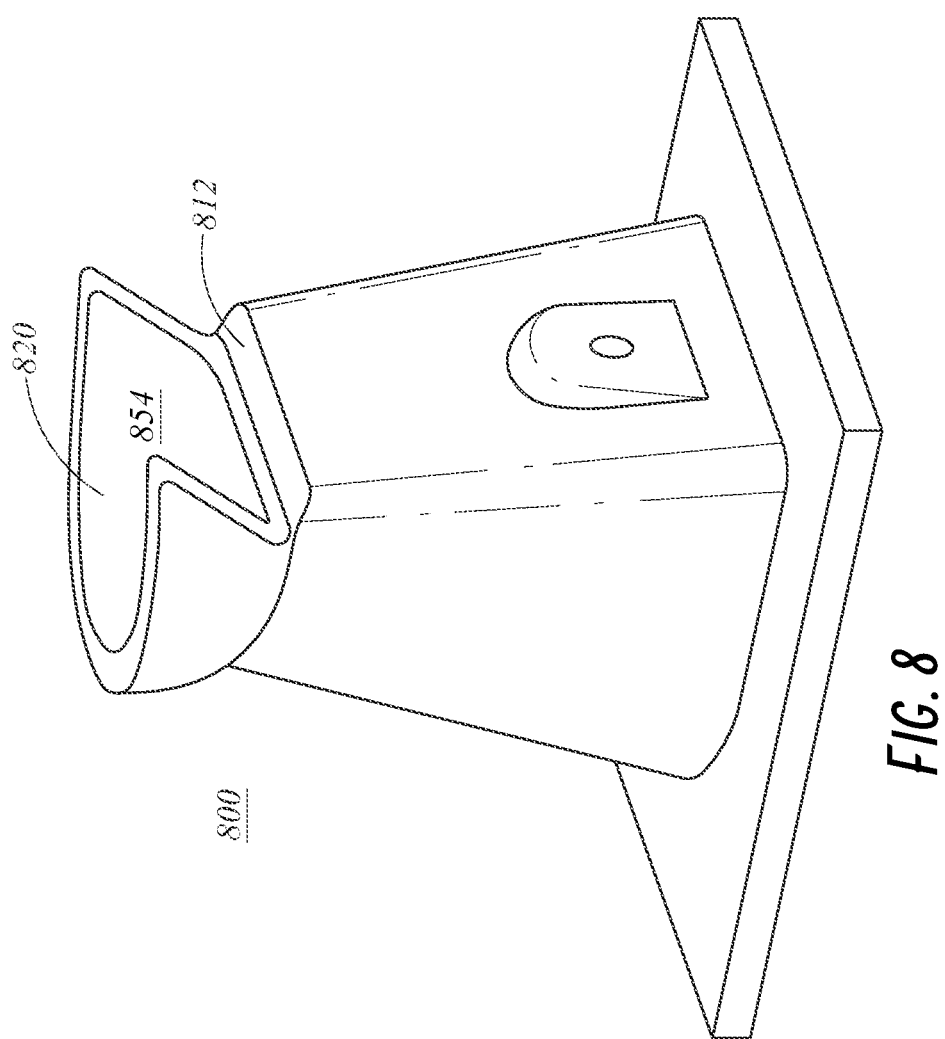
FIG. 8 shows an example of a tooling fixture made with the vacuum granular media as disclosed herein prior to machining the part holding section for the addition of the urethane layer.

Referring now to FIG. 8, an example of a tooling fixture made with the vacuum granular media as disclosed herein prior to machining the part holding section for the addition of the urethane layer is shown. Here a partially fabricated tooling fixture 800 includes a part holding section 854 which is still undergoing shaping. A channel 812 has been milled around the part holding section 854 by removing granular material previously packed into the section as described above. Some foam material 820 remains in the cavity. The channel 812 is partially covered by tape or other means of damming so that urethane material can be poured into the cavity.

Figure 9:
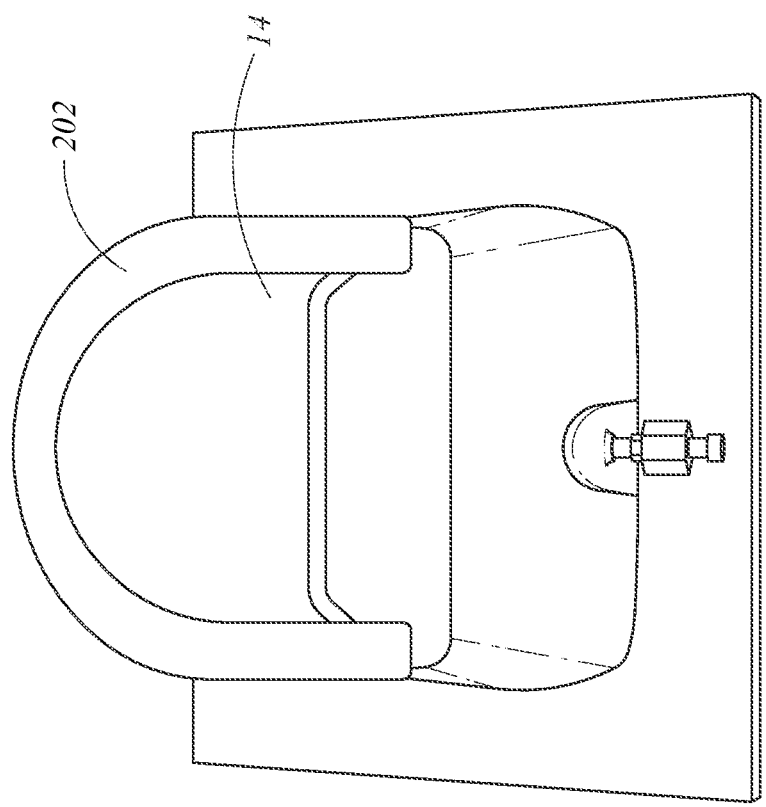
FIG. 9 shows an example of the tooling fixture of FIG. 8 after addition of the urethane layer.

Referring now to FIG. 9, an example of the tooling fixture of FIG. 8 after addition of the urethane layer by first milling out some of the granular material is shown. This will be followed by further machining of both surfaces into the final part holding shape and to introduce an O-ring seal. The urethane layer 202 is added to the channel and surrounds the granular media 14 to provide further stability and vacuum integrity to the tooling fixture.

Figure 10:
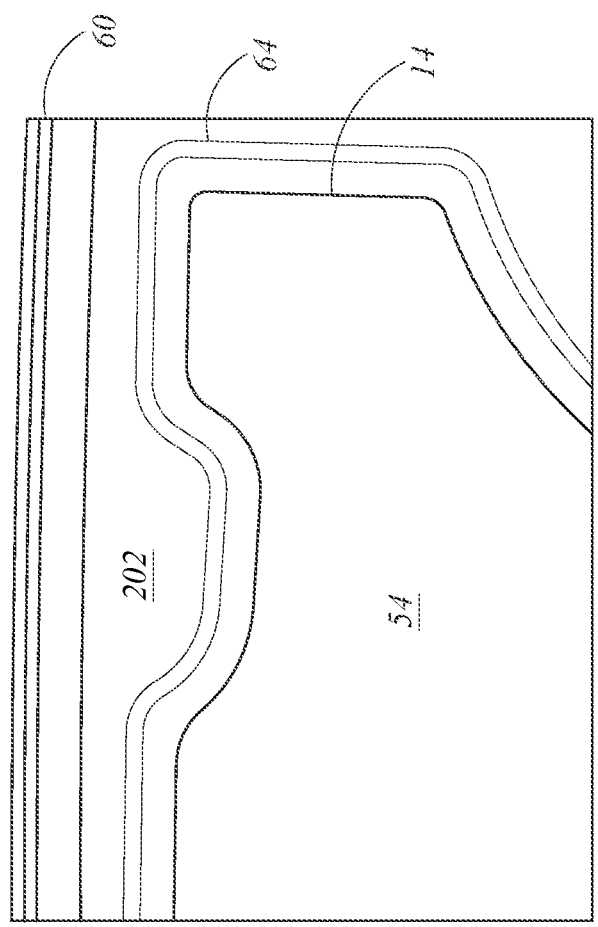
FIG. 10 shows a more detailed side view of an example of a tooling fixture of FIG. 6 made with the vacuum granular media as disclosed herein.

Referring now to FIG. 10, a more detailed side view of an example of a tooling fixture made with the vacuum granular media as disclosed herein is schematically illustrated. An O-ring groove 64 is cut into the urethane layer 202 and the mixture of the granular media with epoxy 14 is shaped to fill the part holding section 54. The mixture is machined to conform to the part to be machined up to the urethane layer. In use an O-ring 80 is inserted into the O-ring groove 64 so that when the part to be machined is inserted it cover and will be held against the O-ring by an applied vacuum to form a vacuum seal. The combination of the urethane layer, O-ring, the granular media and the vacuum will hold a thin part tightly in place while being machined due to the gritty holding properties of the granular material.

Vacuum Forming Thermally Pliable Parts

Figure 11:
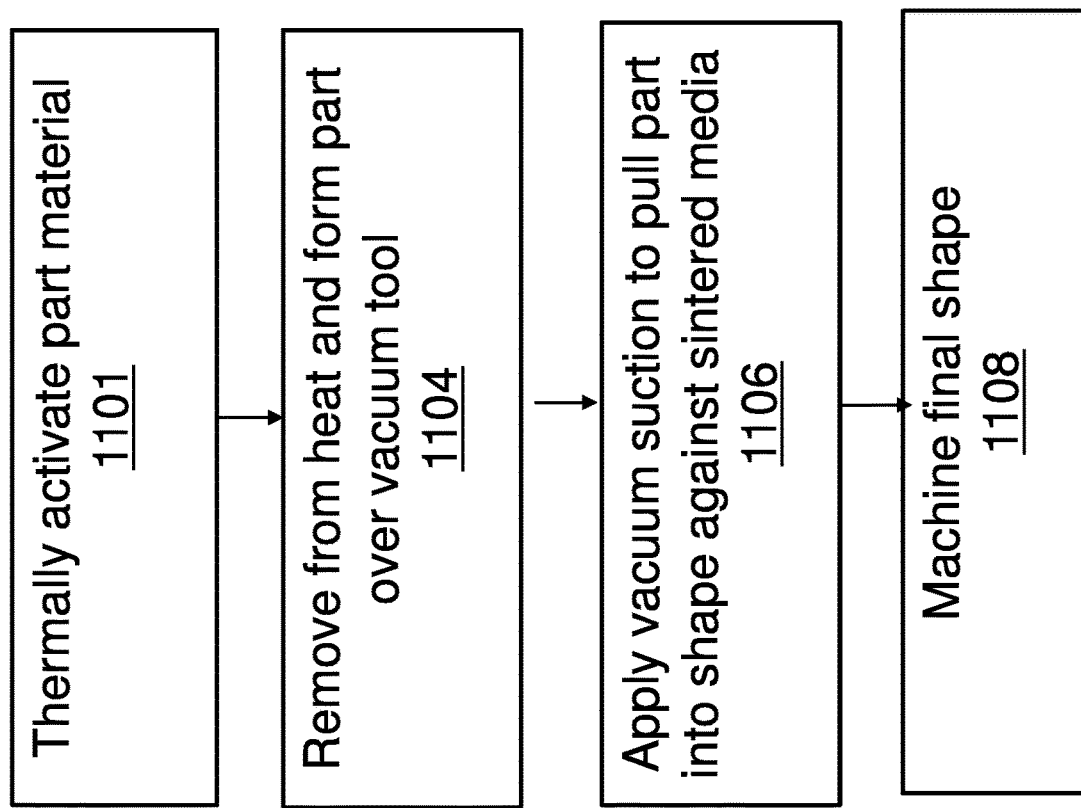
FIG. 11 schematically shows a block diagram of a process for vacuum forming of thermally pliable parts using porous granular media.

Referring now to FIG. 11, a block diagram of a process for vacuum forming of thermally pliable parts using porous granular media is schematically shown. Using the vacuum tooling methods described above, thermally pliable parts may be formed. At step 1101 the part is thermally activated according to known methods and made ready for forming. At step 1104 the part is removed from a heating source, placed into the vacuum tool and formed into the desired shape. The vacuum tool may be made with granular media in accordance with the methods described herein. Then, at step 1106 a vacuum is applied through the granular media to pull the part into the desired shape against the vacuum tooling fixture. At step 1108 the part may be machined and trimmed as necessary.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment, and devices and reconstruction algorithms, and that various modifications, both as to the equipment details and operating procedures, may be accomplished without departing from the true spirit and scope of the present invention.

What is claimed is:

1. A porous granular material for use in combination with a source of vacuum pressure for vacuum tooling, the porous granular material comprising:
   a binding material; and
   an abrasive granular material suspended in the binding material;
   wherein the porous granular material is configured to facilitate passage of a vacuum pressure through the porous granular material; and
   wherein the abrasive granular material comprises a hardened thermoset resin.

2. The porous granular material of claim 1, wherein the binding material comprises a liquid epoxy configured to harden when cast.

3. The porous granular material of claim 1, wherein the abrasive granular material is a fine abrasive rated at about 35 grit size.

4. The porous granular material of claim 1, wherein the hardened thermoset resin comprises a hardened epoxy.

5. The porous granular material of claim 4, wherein the hardened epoxy has a particle size of about 0.060 to 0.100 thousandths of an inch or about 36 grit size.

6. The porous granular material of claim 1, wherein the binding material and abrasive granular material inhibit absorption of moisture.

7. The porous granular material of claim 1, wherein the abrasive granular material comprises irregularly-shaped particulates.

8. The porous granular material of claim 1, wherein a ratio of the binding material to the abrasive granular material is about 8% binding material by volume to about 92% abrasive granular material by volume.

9. The porous granular material of claim 1, wherein the porous granular material can facilitate passage of a vacuum pressure of about 14.7 psi.

10. A porous granular material for use in combination with a source of vacuum pressure for vacuum tooling, the porous granular material comprising:
    a binding material; and
    an abrasive granular material suspended in the binding material;
    wherein the abrasvie granular material comprises a hardened thermoset resin, and
    wherein the binding material comprises a liquid resin configured to harden when cast.

11. The porous granular material of claim 10, wherein the hardened thermoset resin comprises a hardened epoxy.

12. The porous granular material of claim 10, wherein the liquid thermoset resin comprises a liquid epoxy.

13. The porous granular material of claim 10, wherein the hardened thermoset resin is crushed to a fine abrasive.

14. The porous granular material of claim 10, wherein the hardened thermoset resin has a particle size of about 0.060 to 0.100 thousandths of an inch or about 36 grit size.

15. The porous granular material of claim 10, wherein the hardened thermoset resin comprises irregularly-shaped particulates.

16. The porous granular material of claim 10, wherein the porous granular material is configured to facilitate passage of a vacuum pressure through the porous granular material.

17. The porous granular material of claim 16, wherein the porous granular material can facilitate passage of a vacuum pressure of about 14.7 psi.

18. The porous granular material of claim 10, wherein a ratio of the binding material to the abrasive granular material is about 8% binding material by volume to about 92% abrasive material by volume.

19. The porous granular material of claim 10, wherein the binding material and sbrasive granular material inhibit absorption of moisture.

\* \* \* \* \*